(12) United States Patent
Kraus et al.

(10) Patent No.: US 8,572,931 B2
(45) Date of Patent: Nov. 5, 2013

(54) WRAPPING MECHANISM FOR APPLYING ADJACENT ROLLS OF WRAPPING MATERIAL TO A LARGE ROUND BALE

(75) Inventors: Timothy James Kraus, Blakesburg, IA (US); Jeremy Erdmann, Floris, IA (US)

(73) Assignee: Deere & Company, Moline, IL (US)

( * ) Notice: Subject to any disclaimer, the term of this patent is extended or adjusted under 35 U.S.C. 154(b) by 354 days.

(21) Appl. No.: 12/974,533

(22) Filed: Dec. 21, 2010

(65) Prior Publication Data

US 2012/0152132 A1    Jun. 21, 2012

(51) Int. Cl.
*B65B 13/02*    (2006.01)

(52) U.S. Cl.
USPC .................................................. 53/399

(58) Field of Classification Search
USPC ............... 53/399, 587, 589, 204, 211, 215
See application file for complete search history.

(56) References Cited

U.S. PATENT DOCUMENTS

| | | | |
|---|---|---|---|
| 5,129,208 A | 7/1992 | Van Zee | |
| 5,447,009 A * | 9/1995 | Oleksy et al. | 53/399 |
| 6,347,498 B1 * | 2/2002 | Pienta et al. | 53/170 |
| 7,581,368 B1 * | 9/2009 | Bison | 53/399 |
| 2003/0226334 A1 * | 12/2003 | McClure et al. | 53/176 |
| 2009/0211200 A1 * | 8/2009 | Anderson | 53/399 |
| 2010/0236427 A1 * | 9/2010 | Derscheid | 100/5 |

FOREIGN PATENT DOCUMENTS

| | | |
|---|---|---|
| DE | 2705101 | 8/1978 |
| WO | 2011067681 | 6/2011 |

OTHER PUBLICATIONS

European Search Report, Mar. 22, 2012, 8 pages.

\* cited by examiner

*Primary Examiner* — Hement M Desai
(74) *Attorney, Agent, or Firm* — Quarles & Brady LLP (57) ABSTRACT

A bale wrapping mechanism for feeding bale surface wrapping material to an inlet of a baling chamber containing a bale to be wrapped includes a support arrangement for supporting a plurality of wrapping material supply rolls disposed with their adjacent ends either overlapping each other or disposed in axially aligned or end-to-end relationship with each other. In the case of overlapping ends, the adjacent runs of material respectively emanating from the plurality of supply rolls overlap each other and are applied to the circumference of a bale being wrapped in an overlapped arrangement. In the case of axially aligned supply rolls and when the wrapping material is a spreadable net material, a material spreading arrangement is located between the supply rolls and an inlet to the baling chamber and acts to spread the net so that adjacent runs of wrapping material respectively emanating from the plurality of material supply rolls overlap each other and remain overlapped as they are applied to the bale.

12 Claims, 9 Drawing Sheets

WRAPPING MECHANISM FOR APPLYING ADJACENT ROLLS OF WRAPPING MATERIAL TO A LARGE ROUND BALE

FIELD OF THE INVENTION

The present invention relates to large round balers and, more particularly, relates to a wrapping mechanism for applying sheet or net wrapping material to the circumference of a cylindrical bale formed by the baler.

BACKGROUND OF THE INVENTION

It is currently the practice of designers to provide large round balers with bale wrapping mechanism for applying sheet or net wrapping material to the circumference of a bale formed in the baler, with this material being fed from material supply rolls carried on the baler and having a length equal to the width of the baling chamber of the baler. The use of rolls of material of this length has the drawbacks of the rolls being:
 (1) heavy and difficult to handle, and/or
 (2) sized such that the number of bales that can be made from such rolls is less than that desired by customers.

SUMMARY OF THE INVENTION

According to the present invention, there is provided a novel wrapping mechanism for applying sheet or net wrapping material to a bale formed in a large round baler.

An object of the invention is to provide a bale wrapping mechanism which makes it possible to simultaneously use multiple rolls of wrapping material having respective lengths substantially less than the width of the baling chamber of the associated baler.

The foregoing object is accomplished by a first wrapping mechanism embodiment wherein two supply rolls of wrapping material, each having a length slightly greater than a width of the baling chamber are arranged one in front of the other with inner end regions overlapping each other so as to apply wrapping material over a length of the circumference of the cylindrical bale being wrapped, with inner portions of the two segments of wrapping material overlapping in a center region of the bale.

The foregoing object is accomplished by a second wrapping mechanism embodiment wherein multiple supply rolls of wrapping material are supported in end-to-end relationship to each other, with a spreader arrangement being provided for spreading the material, if net, so as to overlap the dispensed material of an adjacent supply roll when being dispensed onto a bale being wrapped.

The foregoing and other objects will become apparent from a reading of the ensuing description together with the appended drawings.

DESCRIPTION OF THE PREFERRED EMBODIMENT

Figure 1:
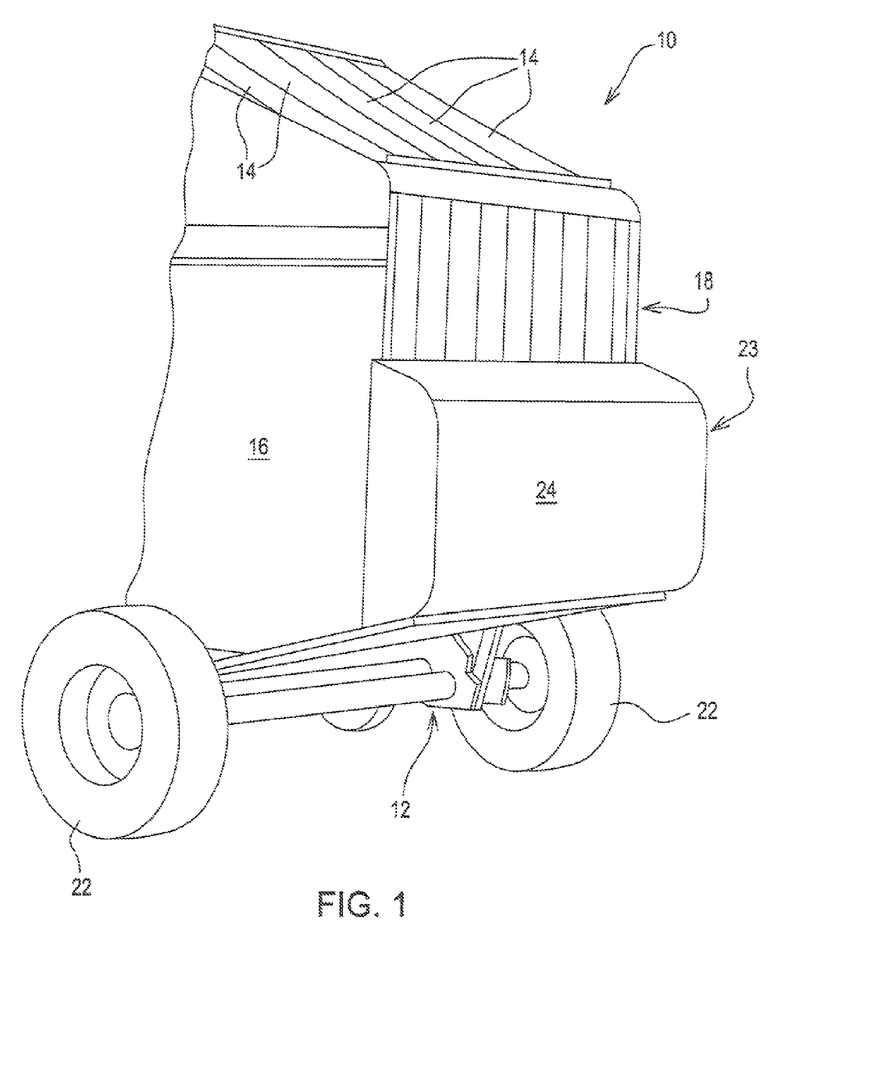
FIG. 1 is a schematic, left rear perspective view of a large round baler shown with a wrapping material dispensing arrangement of a type with which the present invention is particularly adapted for use.
Figure 2:
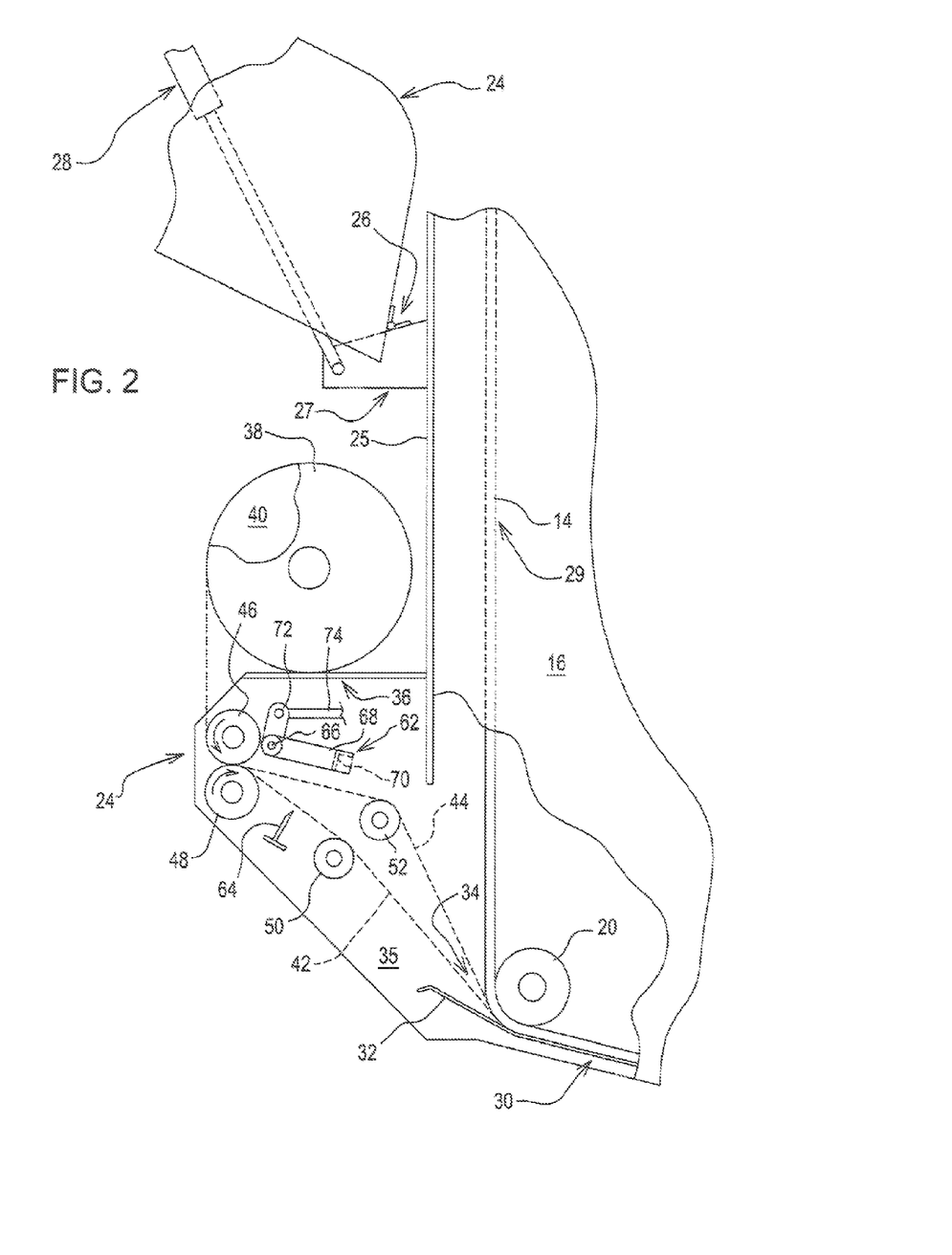
FIG. 2 is a schematic right side view of a wrapping material dispensing constructed in accordance with the principles of the present invention.
Figure 6:
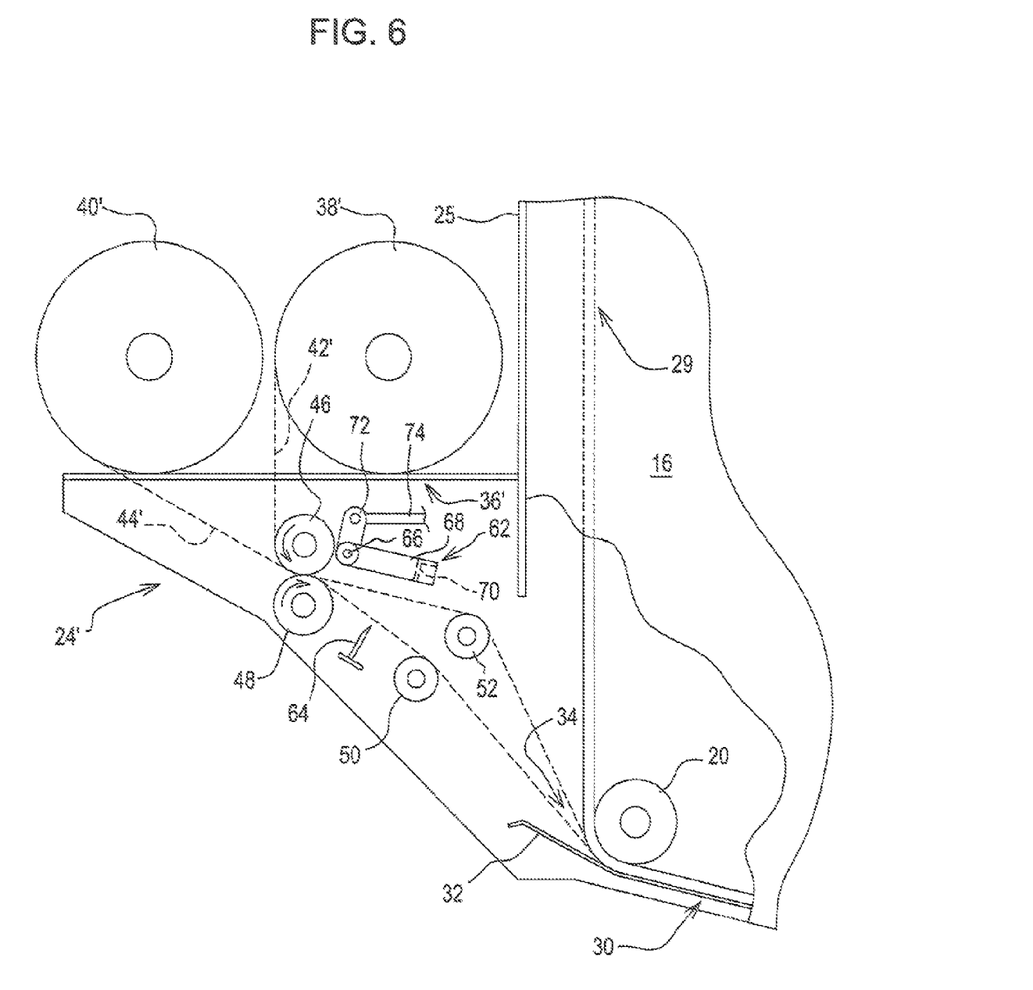
FIG. 6 is a schematic, right side view of a wrapping material dispensing arrangement like that of FIG. 2, but showing a fourth embodiment of the wrapping material dispensing arrangement wherein a first supply roll of wrapping material is shown located forwardly of a second supply roll of wrapping material.

Referring now to FIG. 1, there is shown a rear portion of a large round baler 10 of a type including an expansible bale-forming chamber 12 for making large cylindrical bales and commonly called a large round baler. The bale-forming chamber 12 is formed in part by a plurality of side-by-side mounted, endless belts 14, in part by opposite side walls (not shown) of a fixed forward portion of the baler supporting a first set of belt support rolls, and in part by opposite side walls 16 of a bale discharge gate 18, these walls supporting a second set of belt support rolls including a lower rear gate roll 20 (FIGS. 2 and 6). A pair of ground wheels 22 supports the baler for being towed over the ground by a tractor. A wrapping material dispensing mechanism 23 is mounted across a lower rear region of the discharge gate 18 and includes a cover 24.

Referring now also to FIG. 2, it can be seen that the bale wrapping material dispensing mechanism 24 includes a vertical forward wall 25 extending between and fixed to the side walls 16. The cover 24 is hinged, as at 26 to a bracket arrangement 27 fixed to, and projecting to the rear from the wall 25, and a gas strut arrangement 28 is coupled between the bracket arrangement 27 and the cover 24 in such relationship to the hinge 26 and a lower inside location of the cover 24 that strut arrangement acts to resist opening of the cover 24 when it is closed, as shown in FIG. 1 and moves over center relative to the hinge so that it acts to resist closing of the cover 24 when it is raised to an open position, as shown in FIG. 2.

The forward wall 25 is disposed in parallel relationship to an upright run 29 of the belts 14, the belts 14 extending about a rear portion of the lower gate roll 20 and then forwardly to a lower front gate roll (not shown) at an inlet to the baling chamber 12. The run of the belts 14 extending between the lower rear and lower front rolls is located in close proximity to an upper guide surface of a wrapping material guide pan 30 mounted to the side walls 16 and having a rearward extension 32 that is angled upwardly from a pinch-point 34 defined between the belts 14 and the guide pan 30.

Fixed to, and extending rearward from, the forward wall 26 and between opposite side walls 35 (the right wall being removed) of the dispensing mechanism 24 is a wrapping material supply roll support 36 shown supporting right and left wrapping material supply rolls 38 and 40, respectively, in transverse axial alignment with each other.

It will be appreciated then that the supply rolls 38 and 40 would each weigh half as much as a full length, single supply roll of material. For a reason stated below, the material making up the supply rolls 38 and 40 of this embodiment is preferably constructed of plastic strands woven together by a Raschel weave process so as to be expandable in a direction parallel to a rotation axis of the supply rolls 38 and 40. One manufacturer of supply rolls of such net material provides supply rolls having 13,776 ft. of wrapping material having a width of 4 ft. and weighing 92 lbs., these dimensions and weight being approximate, as are any other dimensions and weights mentioned below. Assuming this wrapping material is used in a baler that produces 5 ft. diameter bales and that two layers of the wrapping material are used to wrap each bale, then each roll can wrap about 444 bales. While this number of bales/roll may be acceptable from a user's standpoint, the 92 lbs. of weight is somewhat excessive. By using two supply rolls of material instead of one, each roll will weigh 46 lbs., which is an acceptable weight for ease of handling while the length of wrapping material in each supply roll remains 13,776 ft. for wrapping the 444 bales.

Feeding of wrapping material from the two supply rolls 38 and 40 to the baling chamber 12 for wrapping a bale formed in the chamber is accomplished in a manner somewhat similar to how material is fed from a single supply roll of wrapping material. Specifically, referring to FIG. 2, which shows the wrapping mechanism 24 in a condition wherein it is simultaneously feeding wrapping material from the supply rolls 38 and 40 for wrapping a bale formed in the baling chamber 12, it can be seen that first and second lengths of wrapping material 42 and 44 respectively extend from rear locations of the right and left wrapping material supply rolls 38 and 40 into a nip defined by upper and lower feed rolls 46 and 48, respectively, having opposite ends mounted to the side walls 35 for rotation and having peripheries engaged with each other. For ensuring that the lengths of net wrapping material 42 and 44 are applied to a bale being wrapped without there being a gap between the lengths of material, the lengths of wrapping material 42 and 44 respectively extend from the feed rolls 46 and 48 over, and into contact with, first and second spreader rolls 50 and 52, and on into the pinch point 34 between the guide pan 30 and the belts 14 where they pass around the lower rear gate roll 20. Thus, spreader rolls 50 and 52 are located in a region between the feed rolls 46 and 48 and the pinch point 34, and have respective opposite ends mounted to the side walls 35 for rotation.

Figure 3:
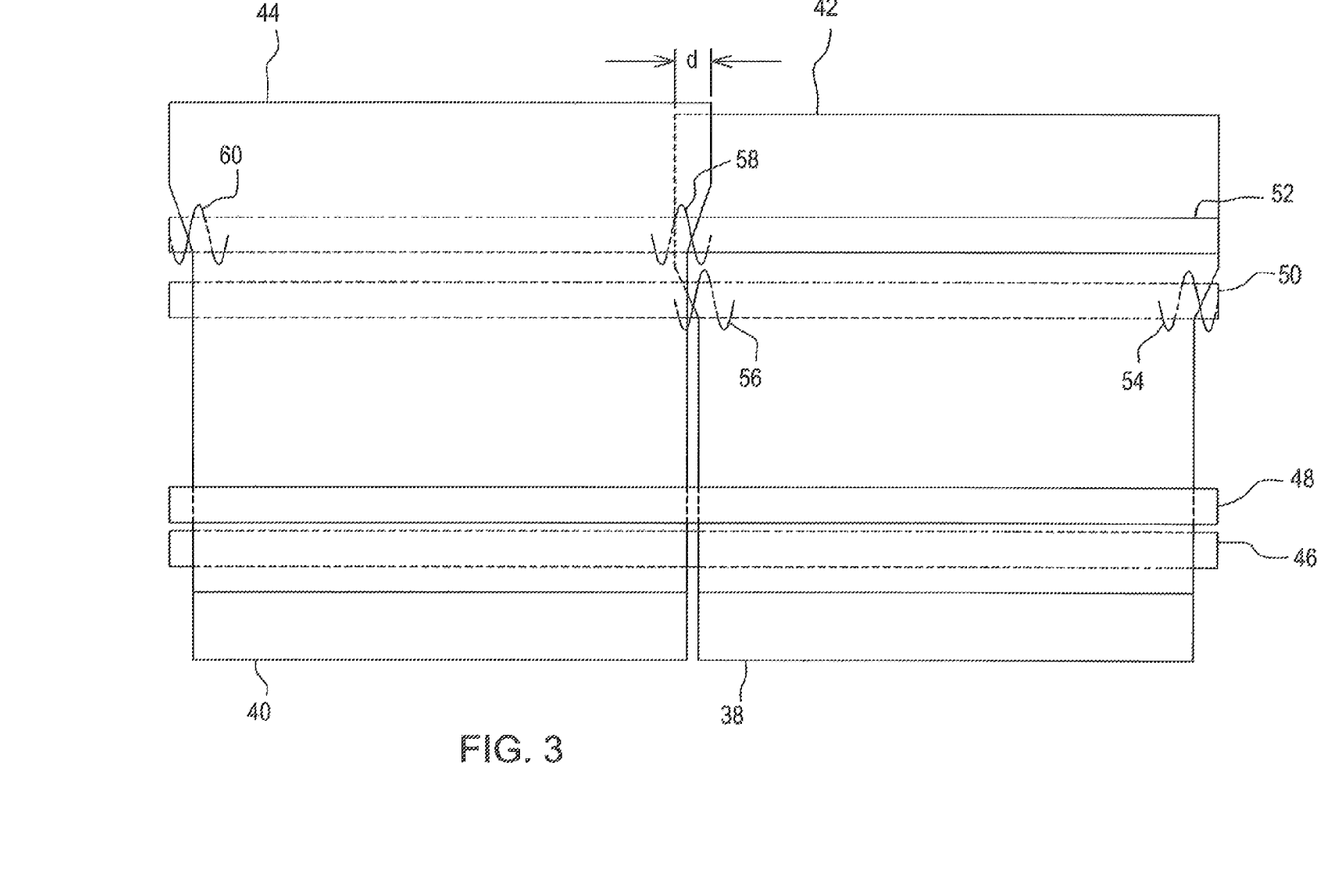
FIGS. 3-5 are schematic top views respectively showing first, second and third embodiments of the wrapping material dispensing arrangement wherein two, three and four wrap material supply rolls are respectively supported in end-to-end relationship to each other for simultaneously providing net wrap material for wrapping a bale formed in the baling chamber of the baler shown in FIG. 1.

Referring now also to FIG. 3, it can be seen that the first spreader roll 50 is provided with right and left spiral elements 54 and 56, respectively, which are of opposite hand and are disposed for engaging right and left side regions of the length of wrapping material 42 so as to spread the width of the length of wrapping material 42. Similarly, the second spreader roll 52 is provided with right and left spiral elements 58 and 60, respectively, which are of opposite hand and disposed for engaging right a left side regions of the length of wrapping material 44 so as to spread the width of the length of wrapping material 44. This spreading of the widths of the lengths of wrapping material 42 and 44 results in the left side of the length of material 42 overlapping the right side of the length of material 44 by a distance d, this overlap remaining as the lengths of wrapping material 42 and 44 extend on into the baling chamber 12 and about the bale being wrapped there.

At a location approximately half-way between the feed rolls 46 and 48, and the spreader rolls 50 and 52 is a cutting device 62 for separating the material wrapped about a bale from the remainder of the wrapping material contained on the supply rolls and extending through the nip of the feed rolls 46 and 48. Specifically, the cutting device 62 comprises an upright blade 64 extending between and having opposite ends fixed to the side walls 35 at a location below and adjacent the length of wrapping material 42, and a transverse rockshaft 66 extending between and having opposite ends mounted for rotation in the side walls 35 at a location just in front of the upper feed roll 46. Respectively fixed to opposite ends of the rockshaft 66 are rear ends of forwardly projecting right and left anvil arms of which only right arm 68 is visible. Extending between and having opposite ends fixed to forward ends of the anvil arms is a transverse anvil 70 defined by an angle member. A crank arm 72 is fixed to the rockshaft 66 adjacent the right anvil arm 68, and an extensible and retractable actuator 74 (only a rear end section being shown) is connected between the gate 18 and the crank arm 72 and is selectively operable between an extended position, as shown in FIG. 3, wherein it acts through the crank arm 72 and rockshaft 66 to hold the anvil 70 above the length of wrapping material 42, and a retracted position, wherein the anvil arms together with the anvil 70 are pivoted downwardly, with downward movement of the anvil 70 resulting in the anvil 70 engaging the lengths of wrapping material 42 and 44 and carrying the lengths of wrapping material against a sharp upper edge of the knife blade 64 so that they are severed upon completion of the wrapping of a bale formed in the baling chamber 12.

Figure 4:
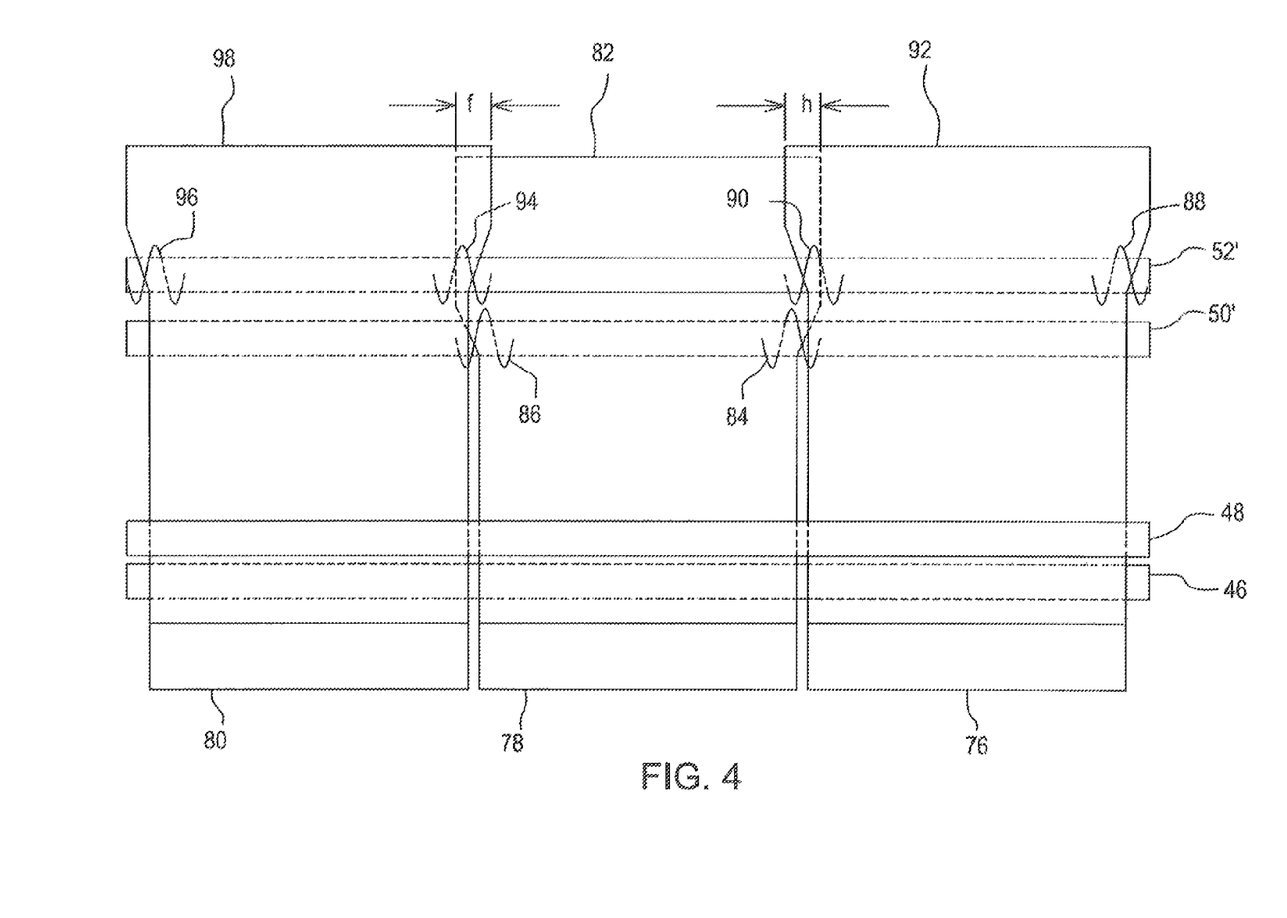

Referring now to FIG. 4, there is shown a second embodiment of the invention wherein three wrapping material supply rolls 76, 78 and 80 are provided for simultaneously supplying net wrapping material for wrapping a bale formed in the baling chamber 12, in lieu of the two supply rolls 38 and 40 of the previously described first embodiment, with the supply roll 78 being between the supply rolls 76 and 80. Thus, each of the supply rolls 76, 78 and 80 has a length which is approximately ⅔ the length of the supply rolls 38 and 40. To accommodate the extra supply roll 80, spreader rolls 50' and 52', respectively, are provided in lieu of the spreader rolls 50 and 52. The spreader roll 50' is provided for spreading a length of net material 82 supplied by the supply roll 78 and includes right and left spiral spreader elements 84 and 86 of opposite hand respectively disposed for engaging right and left margins of the length of net 82. The spreader roll 52' is provided with a first set of right and left spiral spreader elements 88 and 90 respectively disposed for engaging right and left margins of a length of net material 92 supplied by the supply roll 76, while a second set of right and left spiral spreader elements 94 and 96, respectively are disposed for engaging right and left margins of a length of net material 98 supplied by the supply roll 80. As illustrated, the spiral elements 84 and 90 respectively act to spread the adjacent margins of the supply rolls 76 and 78 so that an overlap e occurs, and the spiral spreader elements 86 and 94 respectively act to spread the adjacent margins of the supply rolls 78 and 80 so that an overlap f occurs.

Figure 5:
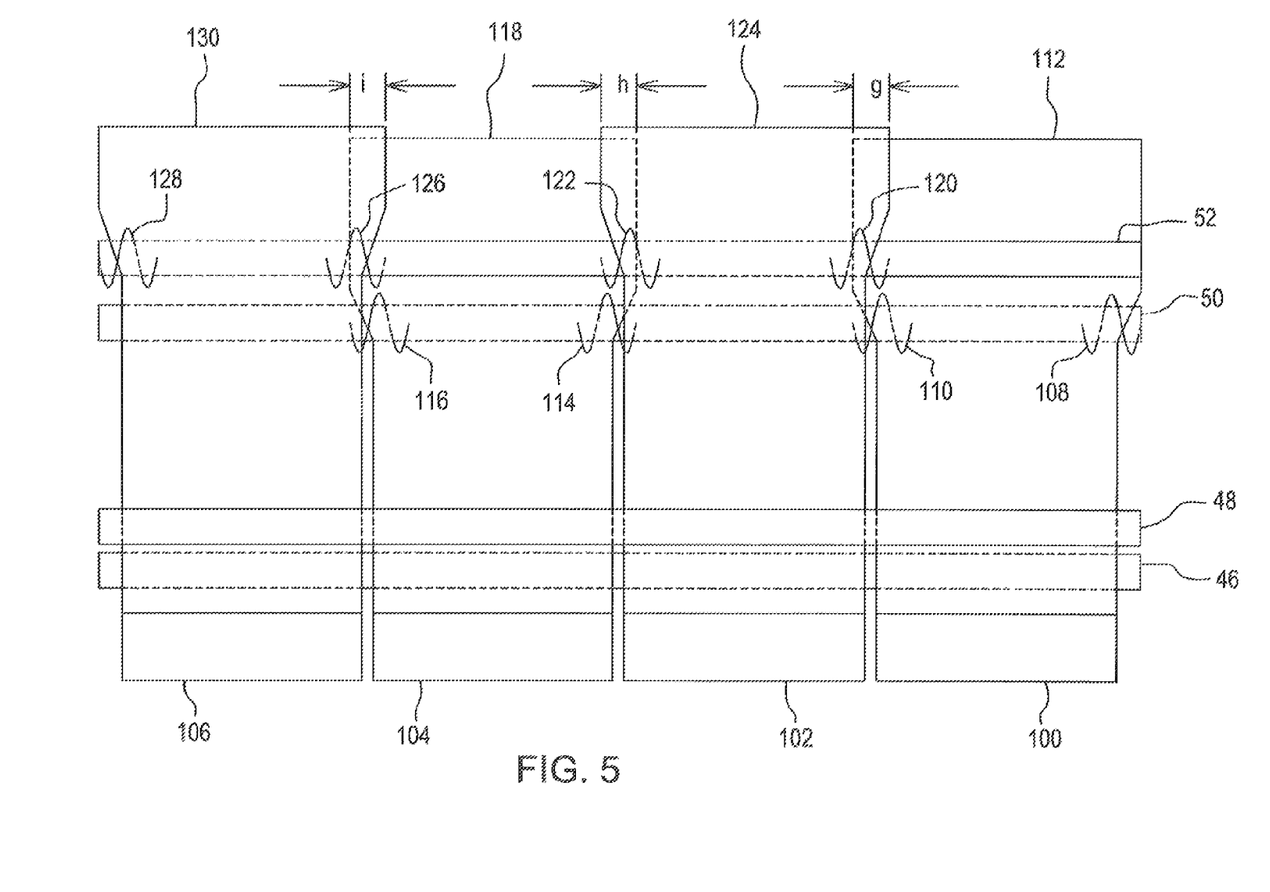

Referring now to FIG. 5, there is shown a third embodiment of the invention wherein four supply rolls of net material 100, 102, 104 and 106 are provided in lieu of the two supply rolls 38 and 40 of the first embodiment, with the roll 102 being between the rolls 100 and 104, and with the roll 104 being between the rolls 102 and 106. Thus, each of the supply rolls 100, 102, 104 and 106 has a length approximately half the length of the rolls 38 and 40, or one fourth the length of a single supply roll used in a baler of a comparable size. This means then that the total length of wrapping material placed into the shorter rolls can be significantly increased while keeping the weight of each of the shorter rolls below that of the single long supply roll. This becomes quite evident by using as example the commercially available net wrapping material supply roll mentioned above which contains 13,776 ft. of material having a width of 4 ft. and a weight of 92 lbs. Thus, the 4 ft. width can be maintained by making each of the supply rolls 100, 102, 104 and 106 approximately 1 ft. wide and to have each roll contain 13,776 ft. of wrapping material, resulting in each of the four supply rolls weighing only about 23 lbs. Thus, it is clear that the length of wrapping material for each roll could be doubled, with each roll then weighing about 46 lbs. While it is unlikely that one would use wrapping material supply rolls that are only 1 ft. wide, it should be kept in mind that this example is only illustrative and that balers for constructing bales 6 feet wide and 6 feet in diameter are known which would make using four supply rolls of wrapping material more desirable.

In this embodiment, a first spreader roll 50" is provided with a first set of right and left spiral spreader elements 108 and 110 respectively located for engaging right and left margins of a length of wrapping material 112 extending from the wrapping material supply roll 100 so as to widen the length of material 112. The first spreader roll 50" is similarly provided with a second set of right and left spiral spreader elements 114 and 116 located for engaging right and left margins of a length of wrapping material 118 extending from the supply roll 104. The second spreader roll 52" is provided with a first set of right and left spiral spreader elements 120 and 122 of opposite hand respectively located for engaging right and left margins of a length of wrapping material 124 extending from the supply roll 102. The second spreader roll 52" is similarly provided with a second set of right and left spiral spreader elements 126 and 128 respectively located for engaging right and left margins of a length of wrapping material 130 extending from the supply roll 106. Thus, it will be appreciated that the spiral elements 110 and 112 spread adjacent margins of the lengths of material 112 and 124 to form an overlap g, the spiral elements 114 and 122 spread adjacent margins of the lengths of material 124 and 118 to form an overlap h, and the spiral elements 116 and 126 respectively spread adjacent margins of the lengths of material 118 and 130 to form an overlap i.

Figure 7:
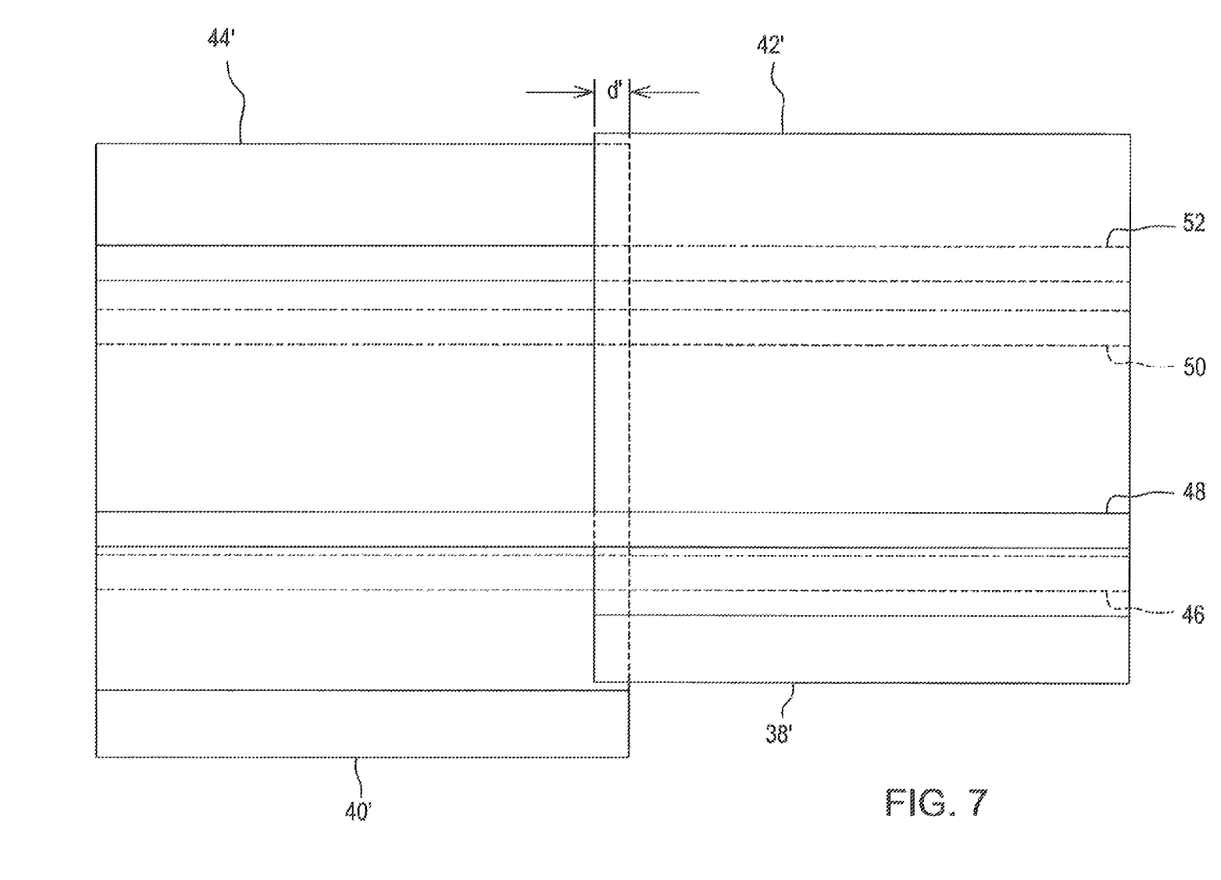
FIG. 7 is a schematic top view of the fourth embodiment shown in FIG. 6.

Referring now to FIG. 6, there is shown a fourth embodiment comprising a bale wrapping mechanism 24', with like structure being indicated using the same reference numerals, as used above, and with similar structure being given the same reference numeral but using a prime (') to designate there is, or could be, a difference. As with the first embodiment, this embodiment includes right and left wrapping material supply rolls 38' and 40', which, as can be seen in FIG. 7 are arranged with the left supply roll 40' located behind the right supply roll 38' and having a right end region disposed in overlapping relationship to a left end region of the right supply roll 38', whereby a left margin of a length of wrapping material 42' extending from the supply roll 38' overlaps a right margin of a length of wrapping material 44' extending from the supply roll 40' by a distance d', making the usage of a spreadable net wrapping material unnecessary, although such a wrapping material could in fact be used. Also, the spreader elements have been omitted from the rolls 50 and 52 in FIGS. 7-9 since the overlap makes them unnecessary. However, if it is desired to use a spreadable net material, the spreader elements may be used to ensure that the lengths of net material, which have a tendency to neck down when under tension, are sufficiently wide when they enter the baling chamber so that the bale is covered from end-to-end.

Figure 8:
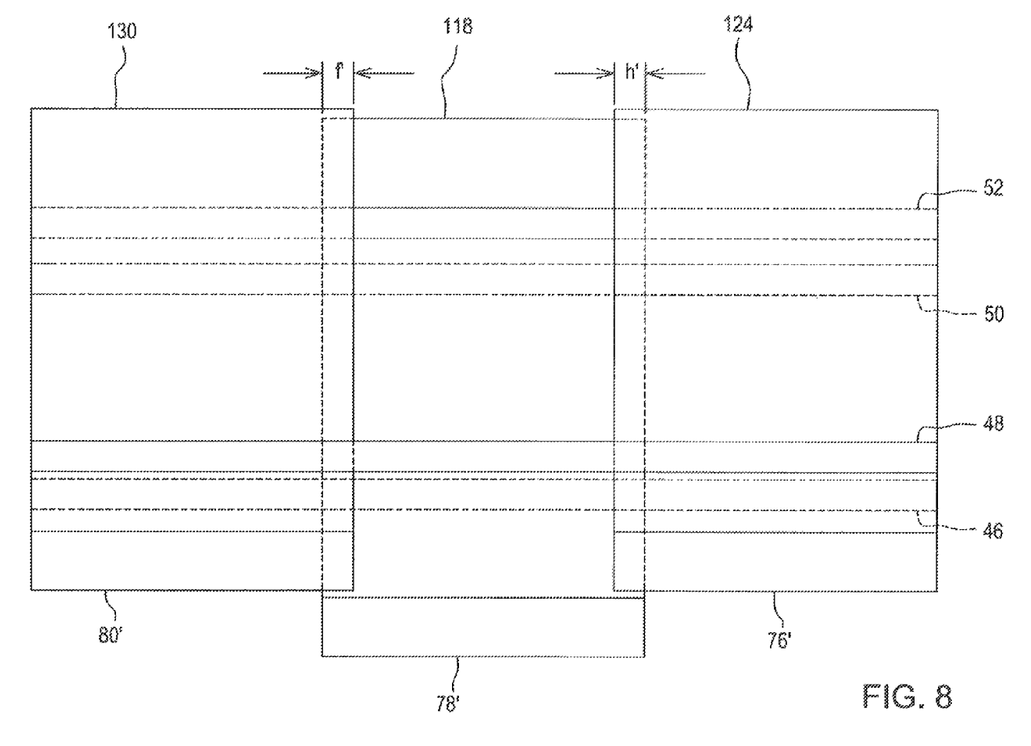
FIG. 8 is a schematic top view like FIG. 7, but showing a fifth embodiment utilizing three supply rolls of wrapping material, with the first and third wrapping material supply rolls being located forwardly of, and overlapping opposite end regions of the second supply roll of wrapping material.

FIG. 8 shows a fifth embodiment wherein three supply rolls of wrapping material 76', 78', and 80' are respectively used with the supply roll 78' being located in a centered overlapping relationship to, and behind, the rolls 76'. A length of wrapping material 118' extends from the roll 78' and has right and left side margins respectively overlapping, by a distance h', a left side margin of a length of wrapping material 124' extending from the right supply roll 76, and overlapping, by a distance f', a right side margin of a length of wrapping material 130' extending from the left supply roll 80'.

Figure 9:
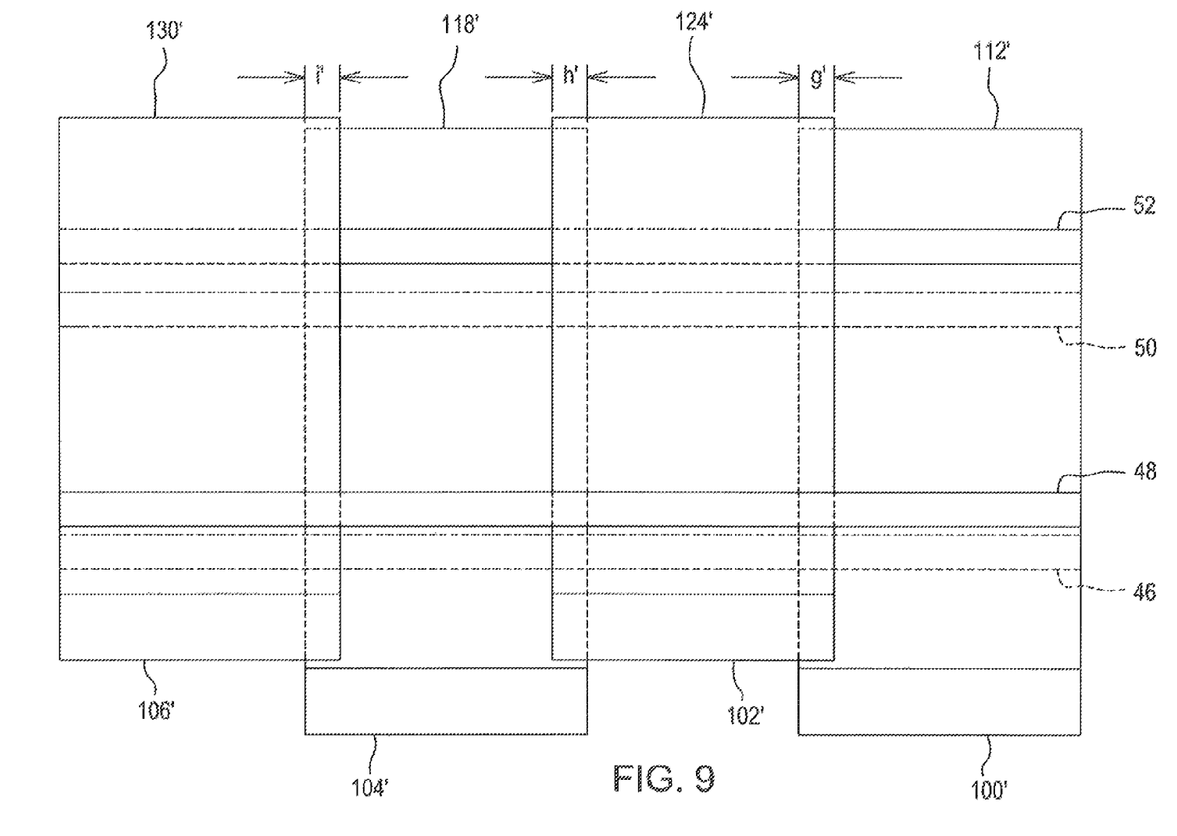
FIG. 9 is a schematic top view, like FIG. 7, but showing a sixth embodiment utilizing four supply rolls of wrapping material, with the first and third supply rolls being located forwardly of, and overlapping respective adjacent end regions of the second and fourth supply rolls of wrapping material.

FIG. 9 shows a sixth embodiment wherein four supply rolls of wrapping material 100', 102', 104' and 106' are used and are respectively arranged from right to left, with the supply rolls 102' and 106' being located rearward of, and in overlapping relationship to, the supply rolls 100' and 104'. The supply rolls 100', 102', 104' and 106' respectively have lengths of wrapping material 112', 124', 118' and 130' extending from them, with right and left side margins of the length of wrapping material 124' respectively overlapping left and right side margins respectively of the lengths of wrapping material 112 and 118 by respective distances g' and h', and with the lengths of wrapping material 118' and 130' respectively having left and right side margins respectively overlapping by a distance i'. With reference to the fourth embodiment illustrated in FIG. 6, it will be understood that the supply rolls 100' and 104' are in axial alignment with each other, with the supply roll 104' occupying part of the area occupied by the supply roll 40', while the supply rolls 102' and 106' are in axial alignment with each other, with the supply roll 102' occupying part of the area occupied by the supply roll 38'. Thus, lengths of material will extend downwardly from each of the rear sides of the supply rolls 102' and 106' and into the nip of the feed rolls 46 and 48 in overlapping relationship to lengths of material extending downwardly form each of the rear sides of the supply rolls 100' and 104'.

The operation of the various embodiments of the invention is thought evident from the foregoing description. Suffice it to say that in each case wrapping material is simultaneously supplied from multiple supply rolls of wrapping material for wrapping a bale formed in the baling chamber of a large round baler. In the embodiments where the supply rolls are mounted in adjacent end-to-end axial alignment with each other, the material used is preferably a spreadable net wrapping material and spreader rolls with spiral spreading elements are provided to ensure that the lengths of wrapping material supplied by the supply rolls have overlapping adjacent side regions so that the entire length of a bale being wrapped is covered.

Having described the preferred embodiment, it will become apparent that various modifications can be made without departing from the scope of the invention as defined in the accompanying claims.

The invention claimed is:

1. A method of wrapping a circumference of a cylindrical bale in web of surface wrapping material comprising:
   a) providing a plurality of wrapping material supply rolls including a first and a second supply roll, each comprising a web of bale surface wrapping material, said plurality of rolls having a combined length approximately equal to a length of a cylindrical bale to be wrapped;
   b) simultaneously advancing wrapping material from said plurality of wrapping material supply rolls and simultaneously applying wrapping material, respectively from said plurality of supply rolls to a circumference of said cylindrical bale so as to cover at least a portion of the length of the circumference of said bale with wrapping material from said plurality of supply rolls; and
   c) spreading a said net wrapping material being advanced from each of said first and second supply rolls at a location between said first and second supply rolls and said bale being wrapped so as to increase a width dimension of the material being advanced from each of said first and second supply rolls such that the material advanced from said first supply roll overlaps the material advanced from said second supply roll;

wherein said step of providing a plurality of supply rolls comprises providing said first and second supply rolls in end-to-end relationship with each other, and wherein said surface wrapping material of said supply rolls is net wrapping material.

2. A method of wrapping a circumference of a cylindrical bale in web of surface wrapping material comprising:
   a) providing a plurality of wrapping material supply rolls, each comprising a web of bale surface wrapping material, said plurality of rolls having a combined length approximately equal to a length of a cylindrical bale to be wrapped;
   b) simultaneously advancing wrapping material from said plurality of wrapping material supply rolls and simultaneously applying wrapping material, respectively from said plurality of supply rolls to a circumference of said cylindrical bale so as to cover at least a portion of the length of the circumference of said bale with wrapping material from said plurality of supply rolls;
   wherein said step of providing a plurality of supply rolls comprises providing first and second supply rolls having inner ends overlapping each other such that wrapping material being advanced from said first supply roll overlaps wrapping material being advanced from said second supply roll.

3. A method of wrapping a circumference of a cylindrical bale in web of surface wrapping material comprising:
   a) providing a plurality of wrapping material supply rolls, each comprising a web of bale surface wrapping material, said plurality of rolls having a combined length approximately equal to a length of a cylindrical bale to be wrapped; and
   b) simultaneously advancing wrapping material from said plurality of wrapping material supply rolls and simultaneously applying wrapping material, respectively from said plurality of supply rolls to a circumference of said cylindrical bale so as to cover at least a portion of the length of the circumference of said bale with wrapping material from said plurality of supply rolls;
   wherein said step of providing a plurality of supply rolls comprises providing first, second and third supply rolls disposed in end-to-end relationship with each other, with said third supply roll being located between said first and second supply rolls and with said first, second and third supply rolls having a total length approximately equal to said length of the cylindrical bale to be wrapped.

4. The method of wrapping a circumference of a cylindrical bale, as defined in claim 3, wherein the wrapping material supplied by each of said first, second and third supply rolls is net wrapping material, and further including the step of:
   c) spreading the net wrapping material being advanced from each of said first, second and third supply rolls such that wrapping material being advanced from said first and second supply rolls overlaps the wrapping material being advanced from said third supply roll.

5. A method of wrapping a circumference of a cylindrical bale in web of surface wrapping material comprising:
   a) providing a plurality of wrapping material supply rolls, each comprising a web of bale surface wrapping material, said plurality of rolls having a combined length approximately equal to a length of a cylindrical bale to be wrapped; and
   b) simultaneously advancing wrapping material from said plurality of wrapping material supply rolls and simultaneously applying wrapping material, respectively from said plurality of supply rolls to a circumference of said cylindrical bale so as to cover at least a portion of the length of the circumference of said bale with wrapping material from said plurality of supply rolls;
   wherein said step of providing a plurality of supply rolls comprises providing first, second, third and fourth supply rolls in end-to-end relationship, with the first, second, third and fourth supply rolls having a total length approximately equal the length of the cylindrical bale to be wrapped.

6. The method of wrapping a circumference of a cylindrical bale, as defined in claim 5, wherein the wrapping material of each of said first, second, third and fourth supply rolls is net wrapping material and said second and third supply rolls of net wrapping material being provided between said first and fourth supply rolls of net wrapping material, and further including the step of:
   c) spreading the width of the net wrapping material being advanced from each of said first, second, third and fourth wrapping material supply rolls at a location between said first, second, third and fourth wrapping material supply rolls, and said cylindrical bale being wrapped, such that the net wrapping material respectively advanced from said third and forth net wrapping material supply rolls overlaps each other and respectively overlaps the net wrapping material advanced from said first and second net wrapping material supply rolls.

7. In combination with a large round baler including a baling chamber surrounding by bale forming elements defining an inlet for bale surface wrapping material for wrapping a circumference of a large cylindrical bale formed in the baling chamber, a wrapping material dispensing mechanism, comprising:
   a wrapping material supply roll support arrangement provided adjacent said baling chamber for supporting a plurality of supply rolls each comprising a web of surface wrapping material;
   a plurality of surface wrapping material supply rolls being supported by said supply roll support arrangement, with said plurality of wrapping material supply rolls having a combined length approximately equal to a width of said baling chamber and being supported to span a width substantially equal to that of said baling chamber; and
   a pair of surface wrapping material feed rolls being located between said plurality of wrapping material supply rolls and said baling chamber inlet and being mounted for gripping wrapping material between them and being selectively driven for simultaneously advancing wrapping material from said plurality of wrapping material supply rolls toward said inlet when it is desired to wrap a circumference of a bale formed in said baling chamber with wrapping material emanating from each of said plurality of supply rolls.

8. The combination, defined in claim 7, wherein said wrapping material supply roll support arrangement is so located relative to said baling chamber that adjacent ends of adjacent ones of said plurality of wrapping material supply rolls are overlapped, whereby the wrapping material respectively emanating from said adjacent ones of said plurality of supply rolls is likewise overlapped.

9. The combination, defined in claim 7, wherein the wrapping material of said plurality of wrapping material supply rolls is net wrapping material; said wrapping material supply roll support arrangement being so located relative to said baling chamber that adjacent ones of said plurality of supply rolls are supported in end-to-end relationship with one another; and a net material spreading arrangement being located between said feed roll arrangement and said baling chamber for spreading the wrapping material emanating from each of said plurality of supply rolls such that the wrapping material of adjacent supply rolls is overlapped as it enters the baling chamber inlet.

10. The combination, as defined in claim 9, wherein said plurality of wrapping material supply rolls comprises first and second wrapping material supply rolls; and said net material spreading arrangement comprising a first spreader roll engaged by net wrapping material emanating from said first supply roll, and a second spreader roll engaged by net wrapping material emanating from said second supply roll.

11. The combination, as defined in claim 9, wherein said plurality of wrapping material supply rolls comprises first, second and third wrapping material supply rolls, with said third wrapping material supply roll being located between said first and second supply rolls; and said net material spreading arrangement including a first spreader roll engaged by wrapping material respectively emanating from said first and second supply rolls, and a second spreader roll engaged by wrapping material emanating from said third supply roll.

12. The combination, as defined in claim 9, wherein said plurality of wrapping material supply rolls comprises first, second, third and fourth wrapping material supply rolls, with said third wrapping material supply roll being located between said first and second wrapping material supply rolls and with said second wrapping material supply roll being located between said third and fourth wrapping material supply rolls; and said net material spreading arrangement including a first spreader roll engaged by the wrapping material respectively emanating from said first and third wrapping material supply rolls, and a second spreader roll engaged by the wrapping material respectively emanating from said second and fourth wrapping material supply rolls.

* * * * *